(No Model.) 2 Sheets—Sheet 2.
T. C. WILKIN.
HARVESTER.
No. 434,494. Patented Aug. 19, 1890.
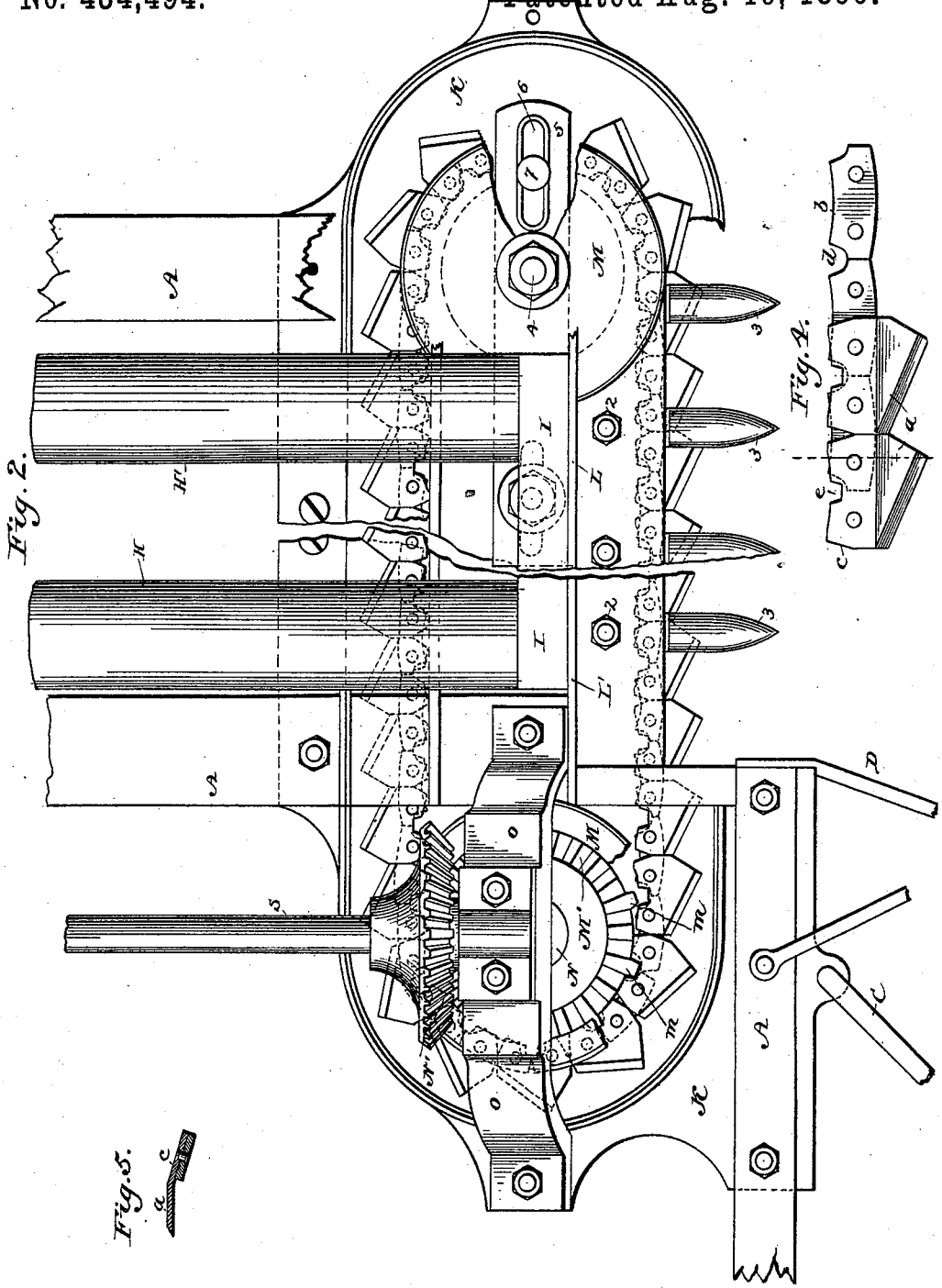
Witnesses
H. W. Elmore
W. L. Hillyer
Inventor
Thomas C. Wilkin
Penne & Goldsborough
Attorneys
THE NORRIS PETERS CO., PHOTO-LITHO., WASHINGTON, D. C.

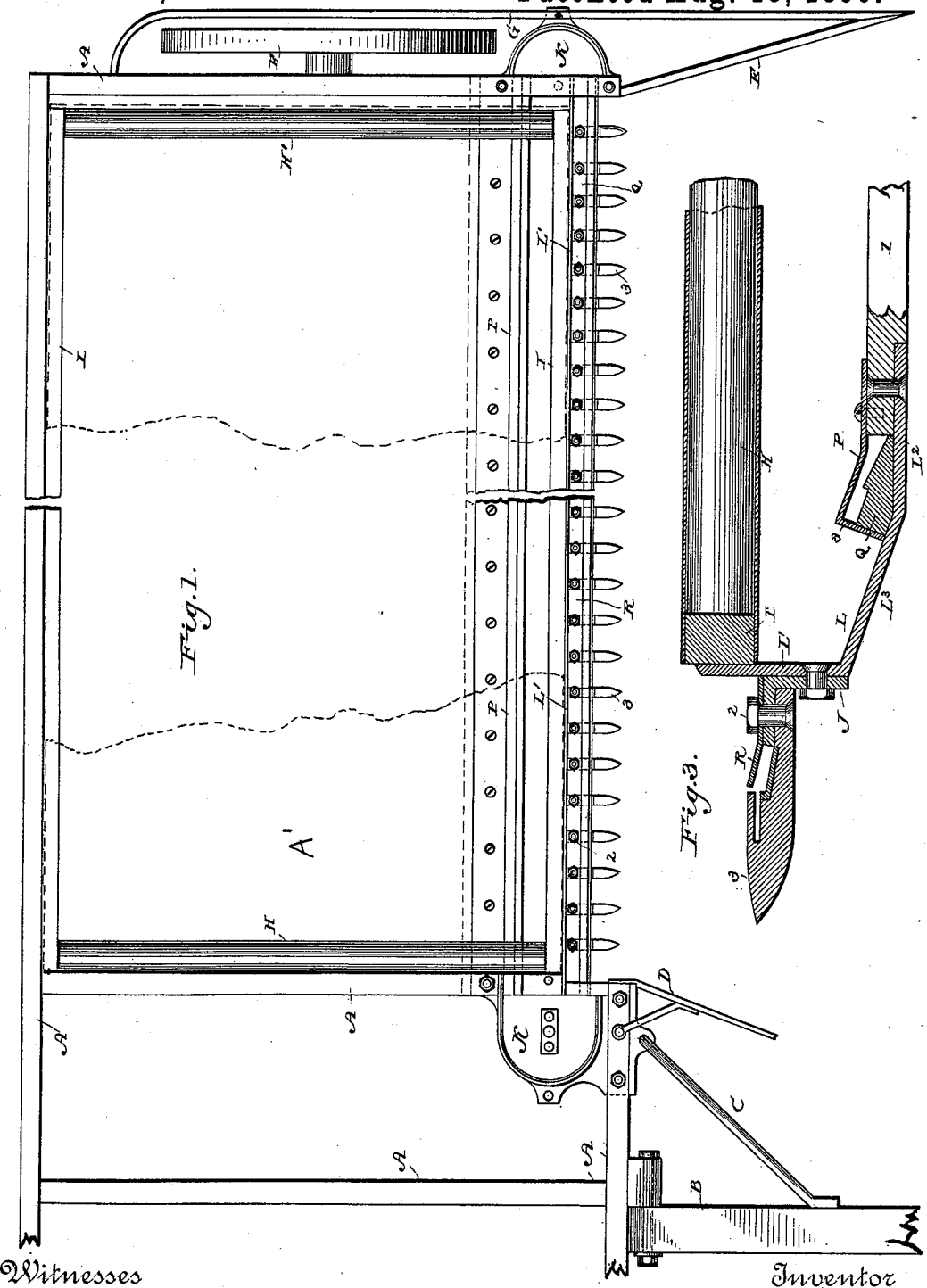

UNITED STATES PATENT OFFICE.

THOMAS C. WILKIN, OF INDEPENDENCE, OREGON.

HARVESTER.

SPECIFICATION forming part of Letters Patent No. 434,494, dated August 19, 1890.

Application filed April 4, 1890. Serial No. 346,558. (No model.)

*To all whom it may concern:*

Be it known that I, THOMAS C. WILKIN, a citizen of the United States, residing at Independence, in the county of Polk and State of Oregon, have invented certain new and useful Improvements in Harvesters; and I do hereby declare the following to be a full, clear, and exact description of the invention, such as will enable others skilled in the art to which it appertains to make and use the same.

My present invention relates to grain harvesters and binders generally, and in particular to that class where endless carrier-aprons are used on the platform to carry the grain as it falls from the cutter to the elevator, whence it is carried by any preferred form of elevating apparatus to the binder or the delivery-spout, as the case may be.

The object of the invention is principally to adapt for use, in connection with machines using this type of grain-conveying mechanism, a cutter having a continuous movement in one direction only, whereby a saving in the power required to drive the cutter is effected, friction is reduced, a lighter draft of the machine is obtained, the liability of breakage of parts of the cutting apparatus is reduced to a minimum, and the front edge of the platform-carrier apron is brought nearer to the line of cut than is possible with other machines using a cutter of this description. I attain these objects by the construction and arrangement of the parts represented in the accompanying drawings, in which—

Figure 1 is a plan view of a harvester embodying my invention; Fig. 2, a plan on an enlarged scale of the cutter, its driving mechanism, the supporting-brackets, &c. Fig. 3 is a vertical central section of the platform, and Figs. 4 and 5 are detail views of the chain.

A A denote the timbers of the ordinary rectangular base-frame of the machine; B, the tongue; C, the tongue-brace; D, the inside divider; E, the outer divider; F, the grain-wheel; G, the grain-wheel guard; H H', the apron-rollers at opposite ends of the platform; I I, the canvas slides at the front and rear sides of the platform, and A' the canvas apron, these parts being the same in construction and arrangement as those now in common use, and forming in themselves no part of my invention.

The usual wooden beam at the front side of the platform is omitted in this machine, and in its place I provide the iron plate L, extending the entire length of the platform proper, and made angular in cross-section, as represented in Fig. 3, having the vertical portion L', the horizontal portion $L^2$, and the intermediate portion $L^3$ inclined to the horizontal portion at an angle of about eighteen degrees, though the exact inclination may be considerably varied. The rear edge of the horizontal portion $L^2$ of this plate is rabbeted to the under side of the front ends of the bottom boards 1 of the platform, as shown in Fig. 3, and to the inner or rear side of the vertical portion L' is attached the front apron-slide I in the same manner in which it is ordinarily attached to the common wooden front beam. To the front side of this vertical portion L' is firmly secured by bolts or rivets the angle-iron finger-bar J, and to the under side of the horizontal flange of this bar are secured by bolts and nuts 2 the guard-fingers 3, not differing from those now in common use, except in the arrangement of the seat or race for the chain of the endless cutter, to be more particularly described hereinafter.

Bolted to the opposite ends of the angular plate L, and connected also to the base-timbers or other suitable parts of the frame by rivets or bolts passing through convenient ears or lugs thereon, are the semicircular castings K K, seated at their inner ends upon and set at the same angle to the horizontal as the inclined portion $L^3$ of the plate L. These castings form the seats or supports for the wheels M at the opposite ends of the platform, around which the endless-chain cutter travels. The inner one of these wheels M is a combined sprocket and gear wheel and acts as the driver for the cutter, while the outer one is a plain idler, made adjustable, however, to keep the chain taut and permit its removal. The inner wheel M is journaled upon a stout stud N, stepped at its lower end into the inner casting K, and braced and carried at its upper end in a yoke or bridge-piece O, spanning the wheel and the casting and bolted to the latter at its opposite ends. The other wheel, instead of being journaled on a fixed stud projecting from the floor of the casting, is mounted on a stud 4, rising from a plate 5, made adjustable in its connection with the outer casting by means of a slot 6 in the plate and a bolt and nut 7, taking into the base of the casting, this arrangement being for the obvious purpose of allowing the ready application and removal of the chain cutter, as well as permitting the taking up of any slack occurring in the chain from wear or other causes.

Running lengthwise the platform and riveted or otherwise secured to the plate L at or about the junction of the inclined and horizontal portions is a wooden or other beam Q, shaped on its upper edge, as shown in Fig. 3, and as hereinafter more specifically described, to form a race or guide way for the inactive ply of the chain cutter. Upon the top of the front ends of the bottom boards 1 of the platform is nailed or screwed a covering-plate P, which extends forward over the chain-race in the wooden beam Q, and is provided along its front edge with the downwardly-extending flange 8. This covering-plate, in connection with ways formed in the upper edge of the beam Q, constitutes a covered guideway for the inactive ply of the chain cutter, effectually preventing the entrance of dust, dirt, straw, or other extraneous matters likely to clog or impair the free working of the chain.

The guard-fingers project horizontally from the under side of the horizontal flange of the angle-iron finger-bar, and are of the usual construction, except that the seat or raceway for the chain-links (which correspond in this type of cutter to the bar upon which the knives are secured in reciprocating cutters) is inclined to the horizontal or cutting face of the guards at about the same angle as the inclined portion $L^3$ of the plate L occupies in relation the horizontal part $L^2$.

Upon the top of the horizontal flange of the finger-bar is riveted or otherwise attached a cover-plate R, similar in function and structure to the one P covering the guideway for the inactive ply, except that it has no depending flange on its front edge. This plate extends forward nearly to the rear ends of the caps or guards of the guard-fingers and serves to hold the chain cutter down to its work as well as to prevent the interference therewith of the butts of the falling grain. The slots in these fingers, through which the cutters play, and the cutting-face of the guards are preferably horizontal, and as it is not desirable to have the horizontal plane of cut much below that of the endless carrier, and it being, moreover, particularly advantageous to have the vertical line of cut as near as possible to the front edge of the carrier, it is obvious that some provision must be made for getting the return or inactive ply of the chain cutter out of the way of the carrier. To accomplish this I set the cutter as a whole to work in a plane oblique to that of the carrier, so that its active ply may operate approximately, if not exactly, in the horizontal plane of the carrier, while its inactive ply lies below the carrier and in rear of its front edges. This arrangement is advantageous for other reasons than those above noted, not the least among which is that it permits a greater range of adjustment in the sizes of the chain-driving gears than could be obtained in the old structures, whereby—by the use of larger wheels, for example—greater speed of the chain may be obtained without the necessity for the use of so much speeding-up gearing as is generally required. This setting of the chain cutter to work as a whole in a plane oblique to the horizon, and at the same time having the knives work, as usual, in a horizontal plane, necessitates some modification in the construction of the cutter itself. I make this cutter in the form of an endless chain or belt composed of plate-links and knife-sections, arranged as shown in Figs. 4 and 5. The knife blades or cutters proper $a$ are set at an oblique angle to the plane of the links $b$ and the shanks $c$ of the knife-sections, and are constructed and connected together in the following manner: The links $b$ are formed of stout plates of steel whose rear edges (and whose front, too, if desired, though this is not necessary) are curved, as shown, to permit them to fit the peripheries of the wheels over which they travel. To permit these links to turn with relation to each other as well as to afford spaces to receive the teeth or cogs of the drive-wheels, the adjacent rear corners of the links are cut out, as shown at $d$. The links so constructed are connected together by the knife-sections themselves, the latter being riveted to the upper side of the former so as to "break joints," as it were, or so that each cutter-section shall overlap two of the links and have a rivet-connection with each. Each section has a notch $e$ cut out of its rear edge in the center, and when the sections are riveted in place on the links these notches register with the notches cut in the meeting edges of the links. The rear corners of the shanks of the knife-sections are chamfered off, so as to allow them to turn, as required, in passing around the wheels.

The wheels M are provided with peripheral flanges to guide and hold the chain, and in the bottom of the groove thus formed, in the drive-wheel, are sprocket-teeth $m$, which fit into the notches cut for them in the chain-links and knife-sections and drive the chain positively. The drive-wheel M has on its upper side a bevel-gear M', which is driven by a miter-gear N' on the shaft S, whose fore end is journaled in the crown of the arched bracket O, and which is driven by the interposition of any suitable gearing from the bull-wheel. The miter-gear should be connected to its shaft by a backing-ratchet, so that when the machine is backed the chain cutter shall not be operated.

The knives, it should be observed, are provided with inclined beveled cutting-edges only on one side, as shown, as they are designed to run in the direction of the traveling carrier only. These knives or cutters are set at an angle to the shanks of the knife-sections and the intermediate links. This angle corresponds with the angle which the race for the chain makes with the cutting-face of the guard-finger. The wooden beam Q is provided on its upper side with inclined surfaces corresponding with those in the guard-fingers, the race for the chain in the beam being on a line with the rack in the fingers, and the beam having also a face corresponding to the cutting-face of the fingers.

The cutter-drive wheels M M, being journaled upon studs rising from the inclined part $L^3$ of the angle-iron plate L, occupy the same inclined position as that part of the plate, and the chain running over the wheels of course has the same inclination. The distance between the two raceways—that in the guard-fingers for the active ply and that in the beam Q for the inactive ply—is equal to about the diameter of the wheels M, so that the rear part of these wheels stand opposite that in the beam, while the front part stands in the same relation to the race in the fingers, this arrangement being obviously necessary that the chain may pass freely into and out of the races as it runs around the wheels.

The construction being as thus described, the operation of the machine will be readily understood by those skilled in the art. I have not deemed it necessary to show or describe the details of construction of the other parts of the machine, as they are not necessary to an understanding of the invention, and can be varied according to the kind of type of machine to which the invention is applied.

I do not wish to be understood as limited to the details of construction of the parts herein shown and claimed, as they can be varied within considerable limits so long as the spirit and scope of my invention are not departed from.

Although I have used the term "horizontal" in the claims in defining the platform, I do not thereby mean to confine the invention to a platform which is actually horizontal, but use the term merely to distinguish the invention from such machines as have an upright or leaning carrier which does not entirely support the grain, but requires some further support for the butt-ends thereof.

What I claim, and desire to secure by Letters Patent, is—

1. In a harvester, the combination of a horizontal platform-carrier and an endless-chain cutter, the active ply of the cutter working in approximately the horizontal plane of the carrier and the inactive ply working below and in rear of the front edge of the carrier, substantially as described.

2. In a harvester, the combination, with the horizontal platform-carrier, of an endless-chain cutter arranged to work in a plane oblique to the horizontal plane of the carrier, whereby the inactive part of the chain may run under the carrier, so as to bring the front or active part near to the edge of the carrier, substantially as described.

3. In a harvester, the combination of the horizontal grain-receiving platform, the endless carrier, the finger-bar, wheels at opposite ends of the latter set at an oblique angle to the plane of the carrier and projecting in rear of the front edge of the latter, and an endless-chain cutter traveling around the wheels, substantially as described.

4. In a harvester, the combination of the grain-receiving platform-frame, the bottom boards, the angle-iron plate having a horizontal portion secured to the latter, a vertical portion secured to the finger-bar, and an intermediate inclined portion, the front canvas slide secured to the rear edge of the vertical portion, the carrier-rollers mounted in the slide at their front ends, brackets secured to the inclined portion of the plate at its ends, obliquely-set wheels carried by said brackets, an endless-chain cutter carried by said wheels, and gearing for driving one of the wheels from the bull-wheel of the machine, substantially as described.

5. In a harvester, the combination of the platform-frame, the bottom board, the angle-iron plate having a horizontal portion secured to the latter, a vertical portion secured to the finger-bar, and an intermediate inclined portion, the front canvas slide secured to the rear edge of the vertical portion, the carrier-rollers mounted at their front ends in the slide, brackets secured to the inclined portion of the plate at its ends, obliquely-set wheels supported by said brackets, guard-fingers secured to the angle-iron finger-bar, a guideway running lengthwise of the horizontal portion of the angle-iron plate under the carrier-rollers, an endless-chain cutter carried by the wheels and running through the guard-fingers and the said guideway, and gearing for driving the said cutter from the main wheel of the harvester, substantially as described.

6. The combination of the guard-fingers having the cutting-surface at an oblique angle to the chain-guide, with an endless-chain cutter having its cutting-blades at a corresponding angle to their shafts and the chain-links, substantially as described.

In testimony whereof I affix my signature in presence of two witnesses.

T. C. WILKIN.

Witnesses:
W. L. WILKIN,
W. L. CULBERTSON.